United States Patent
Gupta et al.

(10) Patent No.: US 8,671,109 B2
(45) Date of Patent: Mar. 11, 2014

(54) CONTENT-BASED VIDEO COPY DETECTION

(75) Inventors: Vishwa N. Gupta, Brossard (CA); Parisa Darvish Zadeh Varcheie, Montreal (CA)

(73) Assignee: CRIM (Centre de Recherche Informatique de Montreal), Montreal, Quebec (CA)

( * ) Notice: Subject to any disclaimer, the term of this patent is extended or adjusted under 35 U.S.C. 154(b) by 0 days.

(21) Appl. No.: 13/310,092

(22) Filed: Dec. 2, 2011

(65) Prior Publication Data

US 2012/0143915 A1 Jun. 7, 2012

Related U.S. Application Data

(63) Continuation-in-part of application No. 12/896,582, filed on Oct. 1, 2010.

(60) Provisional application No. 61/247,728, filed on Oct. 1, 2009.

(51) Int. Cl.
*G06F 7/00* (2006.01)
*G06F 17/30* (2006.01)

(52) U.S. Cl.
USPC .......................................... 707/769; 707/780

(58) Field of Classification Search
USPC ........................................................ 707/769
See application file for complete search history.

(56) References Cited

U.S. PATENT DOCUMENTS

| | | | | |
|---|---|---|---|---|
| 5,606,655 | A * | 2/1997 | Arman et al. | 345/440 |
| 7,359,889 | B2 * | 4/2008 | Wang et al. | 707/661 |
| 2004/0258397 | A1 * | 12/2004 | Kim | 386/94 |
| 2005/0091275 | A1 * | 4/2005 | Burges et al. | 707/104.1 |
| 2005/0243103 | A1 * | 11/2005 | Rudolph | 345/647 |
| 2006/0182368 | A1 * | 8/2006 | Kim | 382/305 |
| 2008/0317278 | A1 * | 12/2008 | Lefebvre et al. | 382/100 |
| 2009/0154806 | A1 * | 6/2009 | Chang et al. | 382/173 |
| 2010/0085481 | A1 * | 4/2010 | Winter et al. | 348/513 |
| 2010/0247073 | A1 * | 9/2010 | Nam et al. | 386/94 |
| 2010/0329547 | A1 * | 12/2010 | Cavet | 382/164 |

OTHER PUBLICATIONS

Cardinal et al., "Content-Based Advertisement Detection", Interspeech 2010, Makuhari, Chiba, Japan, Sep. 26-30, 2010, pp. 2214-2217.

Gupta et al., "CRIM's Content-based Audio Copy Detection System for TRECVID 2009", Multimedia Tools and Applications, 2010, Springer Netherlands, DOI: 10.1007/s11042-010-0608-x, Sep. 30, 2010, 16 pages.

(Continued)

*Primary Examiner* — Binh V Ho
(74) *Attorney, Agent, or Firm* — Wilmer Cutler Pickering Hale and Dorr LLP

(57) ABSTRACT

A method to detect video copying based on content. The method comprises providing a set of reference data elements derived from a set of reference video frames in a reference video stream; providing a set of query data elements derived from a set of query video frames in a query video stream, each of the query data elements having a corresponding query data element identifier; associating with each of the reference data elements a fingerprint selected from among the query data element identifiers; and determining a similarity measure for the query video stream relative to the reference video stream by a comparison of the query data element identifiers to the fingerprints.

37 Claims, 6 Drawing Sheets

(56) References Cited

OTHER PUBLICATIONS

Kraaij et al., "TRECVID 2009 Content-based Copy Detection task Overview", 2009, www-nlpir.nist.gov/projects/tvpubs/tv.pubs.org.html#2009, Dec. 7, 2009, 76 pages.

Kraaij et al., "TRECVID 2010 Content based Copy Detection task overview", 2010, www-nlpir.nist.gov/projects/tvpubs/tv.pubs.org.html, Mar. 1, 2011, 26 pages.

Kraaij et al., "TRECVID-2008 Content-based Copy Detection task Overview", www-nlpir.nist.gov/projects/tvpubs/tv8.slides/CBCD.slides.pdf, Dec. 17, 2008, 33 pages.

Li et al., "PKU-IDM@TRECVid 2010: Copy Detection with Visual-Audio Feature Fusion and Sequential Pyramid Matching", www-nlpir.nist.gov/projects/tvpubs/tv.pubs.org.html, Mar. 1, 2011, 6 pages.

Liu et al., "AT&T Research at TRECVID 2009 Content-based Copy Detection", 2009, www-nlpir.nist.gov/projects/tvpubs/tv.pubs.org.html#2009, Mar. 1, 2010, 8 pages.

Over et al., "Guidelines for the TRECVID 2009 Evaluation", www-nlpir.nist.gov/projects/tv2009/, NIST—National Institute of Standards and Technology, Jan. 26, 2010, 15 pages.

Mukai et al., "NTT Communications Science Laboratories at TRECVID 2010 Content-Based Copy Detection", Proc. TRECVID 2010, Gaitersburg, MD, USA, Mar. 1, 2011, 10 pages.

Office Action for U.S. Appl. No. 12/896,582 mailed on Apr. 10, 2013. 14 pages.

\* cited by examiner

CONTENT-BASED VIDEO COPY DETECTION

CROSS-REFERENCE TO RELATED APPLICATION(S)

The present application is a continuation-in-part (CIP) of U.S. patent application Ser. No. 12/896,582, filed on Oct. 1, 2010, hereby incorporated by reference herein. Benefit is claimed under 35 USC §120.

FIELD OF THE INVENTION

The present invention relates to techniques for determining if video data that may be broadcast, transmitted in a communication channel or played is a copy of a video stream within a repository. Such techniques can be used to perform copy detection for copyright infringement purposes or for advertisement monitoring purposes.

BACKGROUND

There are many applications of video copy detection, such as for copyright control, for monitoring advertisement campaigns of businesses, for monitoring ads of competitors for business intelligence, and for law enforcement investigations.

An existing solution for video copy detection is watermarking. In watermarking, digital artifacts (watermarks) are covertly embedded into certain portions of an original video stream. Using specialized digital processing, the digital artifacts, if they are present in a suspect video stream, can be detected. This signals the presence of the watermarked portions in the suspect video stream, and can serve to infer, to a certain degree, that a copy of the original video stream is present in the suspect video stream.

A problem with watermarking is that only the content that has been watermarked can be detected. Therefore, portions of an original video stream that have not been watermarked cannot be detected as being present in a suspect video stream even if they are indeed present. Since watermarking involves both front-end processing and an up-front cost, it is not always a convenient option. Furthermore, distortion in a suspect video stream can affect the reliability with which watermarks can be detected in the suspect video stream.

As an alternative to watermarking, content-based copy detection can be used in order to detect an original video segment of which there is a copy in the search database, without the need for processing at the video generation or transmission end.

However, existing video copy detection techniques provide inadequate performance when measured in terms of, for example, normalized cost detection rate (NCDR).

Accordingly, there exists in the industry a need to provide improved solutions for content-based video copy detection.

SUMMARY

A first broad aspect of the present invention seeks to provide a method to detect video copying. The method comprises providing a set of reference data elements derived from a set of reference video frames in a reference video stream; providing a set of query data elements derived from a set of query video frames in a query video stream, each of the query data elements having a corresponding query data element identifier; associating with each of the reference data elements a fingerprint selected from among the query data element identifiers; and determining a similarity measure for the query video stream relative to the reference video stream by a comparison of the query data element identifiers to the fingerprints.

A second broad aspect of the present invention seeks to provide a method to detect video copying. The method comprises providing a set of query data elements derived from a set of query video frames in a query video stream, each of the query data elements having a corresponding query data element identifier; accessing a repository of reference sequences, each reference sequence associated with a respective reference video stream and comprising a respective set of reference data elements derived from a respective set of reference video frames in the respective reference video stream. In addition, for each particular reference sequence associated with a particular reference video stream, the method comprises associating with each of its reference data elements a fingerprint selected from among the query data element identifiers; and determining a similarity measure for the query video stream relative to the particular reference video stream by a comparison of the query data element identifiers to the fingerprints. Also, the method comprises outputting an indication that a particular test video stream contains a copy of the query video stream when the similarity measure for the particular video stream relative to the query video stream meets predetermined criteria.

A third broad aspect of the present invention seeks to provide a computer-readable storage medium storing computer-readable instructions which, when interpreted by a computing apparatus, cause the computing apparatus to implement a method to detect video copying that comprises: providing a set of reference data elements derived from a set of reference video frames in a reference video stream; providing a set of query data elements derived from a set of query video frames in a query video stream, each of the query data elements having a corresponding query data element identifier; associating with each of the reference data elements a fingerprint selected from among the query data element identifiers; and determining a similarity measure for the query video stream relative to the reference video stream by a comparison of the query data element identifiers to the fingerprints.

A fourth broad aspect of the present invention seeks to provide a computing system, which comprises: an input for receiving a set of query data elements derived from a set of query video frames in a query video stream, each of the query data elements having a corresponding query data element identifier; a repository for storing reference sequences, each reference sequence associated with a respective reference video stream and comprising a respective set of reference data elements derived from a respective set of reference video frames in the respective reference video stream; a processing unit for (i) associating with each of the reference data elements in each of the reference sequences a fingerprint selected from among the query data element identifiers and (ii) determining a similarity measure for the query video stream relative to at least one particular reference video stream by a comparison of the query data element identifiers to the fingerprints associated with the reference data elements in the reference sequence associated with the particular reference video stream; and an output for releasing an indication of the similarity measure.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION

Figure 1:
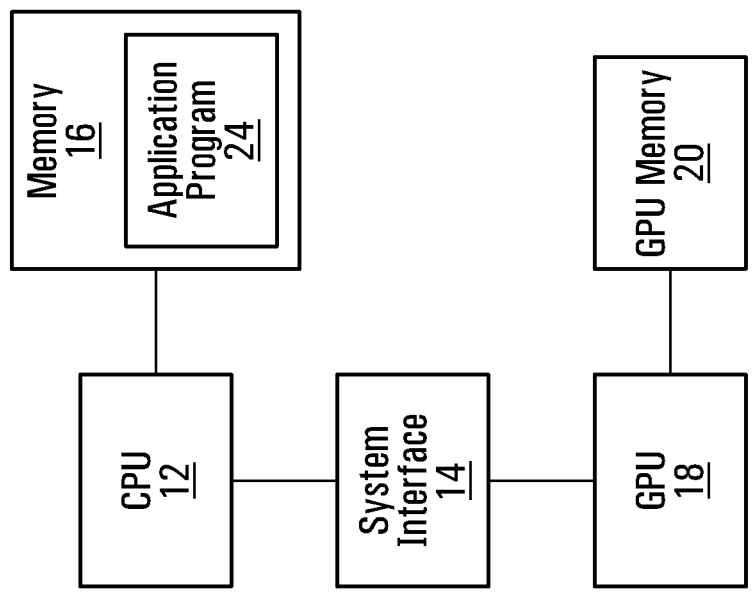
FIG. 1 is a block diagram of a computer system that can be used to implement a content-based video copy detection process, in accordance with certain non-limiting embodiments of the present invention.

With reference to FIG. 1, there is shown a block diagram of a computing system 10 configured to implement one or more aspects of the present invention. The computing system 10 includes a central processing unit (CPU) 12, a system interface 14 and a computer-readable storage medium such as a memory 16. Optionally, a graphics processing unit (GPU) 18 may be provided, together with a GPU memory 20. The CPU 12 connects to the memory 16 and the system interface 14. The CPU 12 executes programming instructions stored in the memory 16, operates on data stored in memory 16 and, if necessary, communicates with the GPU 18 through the system interface 14. In some embodiments, one or more of the CPU 12, the GPU 18 and the memory 16 may be distributed amongst a plurality of components which may communicate over a network. In alternate embodiments, the CPU 12, the GPU 18, the system interface 14, or any combination thereof, may be integrated into a single processing unit. Further, the functionality of GPU 18, if provided, may be included in a chipset or in some other type of special purpose processing unit or co-processor.

The memory 16 stores programming instructions and data for processing by the CPU 12. The memory 16 can connect directly to the CPU 12 (as shown) or via the system interface 14, which can include a memory controller. The GPU 18, if used, receives instructions transmitted by the CPU 12 via the system interface 14 and processes these instructions in order to carry out a variety of graphics processing functions on data, such as video frames, stored in the GPU memory 20. The GPU 18 is specialized at executing graphics processing functions and although the GPU 18 can display certain graphics images stored in the GPU memory 20, it is feasible to utilize the GPU 18 purely for its parallel processing capabilities.

The memory 16 includes application data, as well as an operating system, various drivers and so on. The memory 16 also includes an application program 24, which can comprise a sequence of programming instructions for execution by the CPU 12. In an example, execution of the programming instructions forming part of the application program 24 can cause the CPU 12 to carry out a content-based video copy detection process as described in further detail herein below. Certain ones of the instructions forming part of the application program 24 can include graphics API calls, by virtue of which the application program 24 can invoke functionality of the GPU 18 if needed. It should be appreciated that the GPU 18 is not essential, and that in certain embodiments, the processing functions described herein can be carried out by the CPU 12 without assistance from the GPU 18.

Figure 2:
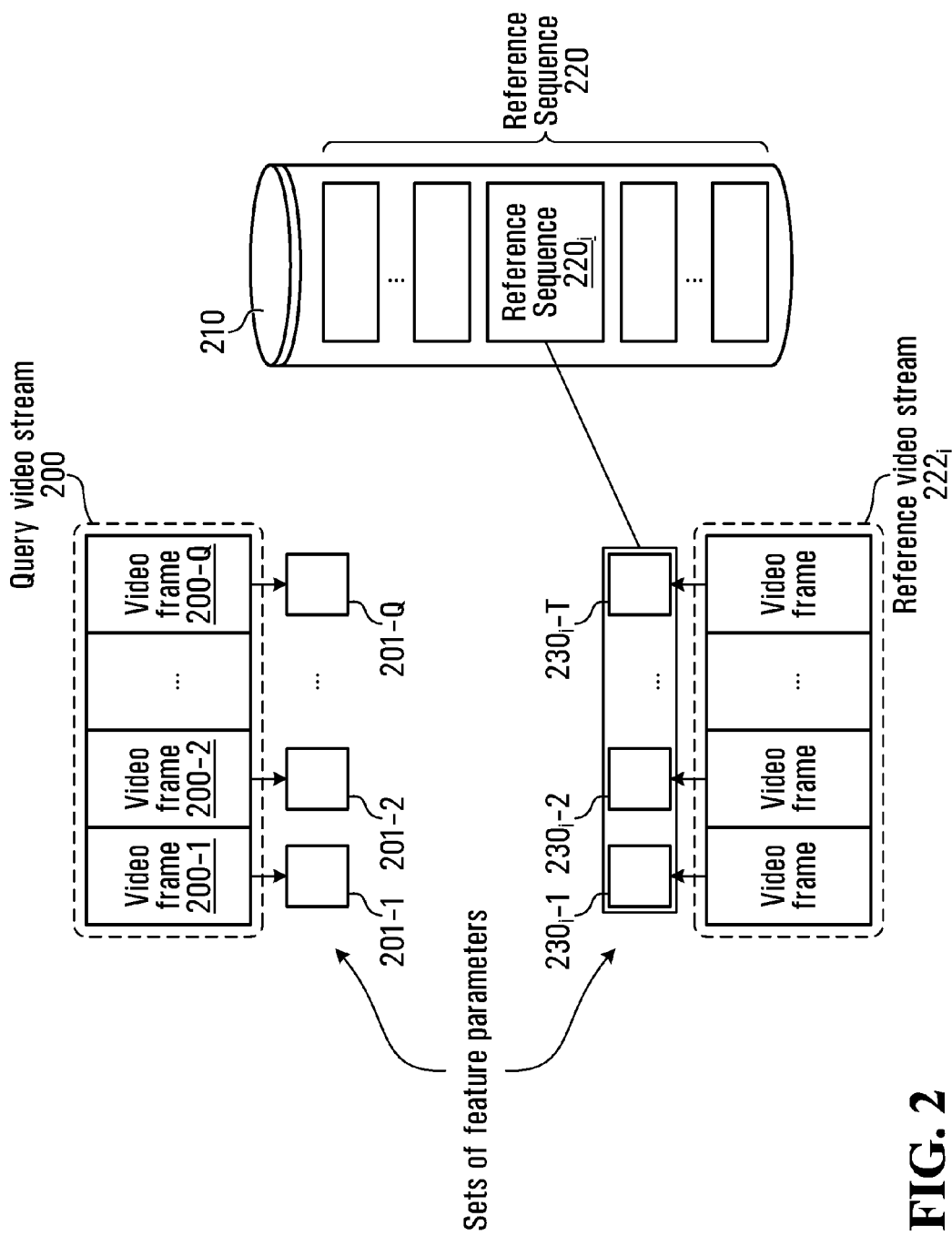
FIG. 2 is a diagram that conceptually illustrates a feature extraction sub-process, which forms part of the content-based video copy detection process, in accordance with a specific non-limiting embodiment of the present invention.

Reference is now made to FIG. 2, which illustrates a repository (or database) 210 comprising a plurality of reference sequences 220. The repository 210 can form part of the memory 16 of the computer system 10. Since the memory 16 can be local or distributed, the repository 210 may in some embodiments be accessible over a distance e.g., over a network such as a storage area network (SAN), a local area network (LAN) or the Internet.

Each of the reference sequences 220 in the repository 210 is a parametrized representation of a respective one of a plurality of reference video streams made up of video frames containing pixels. For example, a reference sequence $220_i$ is a parametrized version of a reference video sequence $222_i$ made up of video frames. Although the reference sequences 220 are stored in the repository 210, the respective reference video streams from which they are derived might not be stored in the repository 210 in order to save space in memory that would otherwise be required to store a large volume of pixels, possibly at high resolution. For this reason, FIG. 2 illustrates the reference video streams 222, as being outside the repository 210.

Consider now more specifically reference sequence $220_i$, which can be defined as a sequence of $T_i$ data elements (referred to for clarity as "reference data elements") $230_i$-1, $230_i$-2, ..., $230_i$-$T_i$. The variable $T_i$ is an integer representing the number of reference data elements in reference sequence $220_i$, and its value is not particularly limited. Each of the reference data elements $230_i$-1, $230_i$-2, ..., $230_i$-$T_i$ in reference sequence $220_i$ can include a set of feature parameters associated with a respective video frame in the particular reference video stream $222_i$. Further details regarding possible ways of computing the reference data elements $230_i$-1, $230_i$-2, ..., $230_i$-$T_i$ are provided herein below.

Continuing with the description of FIG. 2, there is also provided a query video stream 200. The query video stream 200 can be defined as a sequence of Q video frames 200-1, 200-2, ..., 200-Q containing pixels. The variable Q is an integer representing the number of video frames in the query video stream 200, and its value is not particularly limited. The query video stream 200 may be broadcast, transmitted in a communication channel or played from disk. Upon receipt of the query video stream 200, video frames 200-1, 200-2, ..., 200-Q can be stored in the memory 16 of the computing system 10 (e.g., in the repository 210 and/or in a buffer).

The content-based video copy detection process aims to assess whether the query video stream 200 is deemed to include a copy of at least a portion of at least one of the reference video streams (including reference video stream $222_i$). This is done by deriving sets of feature parameters from the query video stream 200 and performing comparisons of those sets of feature parameters with the reference sequences 220 (which, it will be recalled, include sets of feature parameters computed for respective reference video streams). In the affirmative, the content-based video copy detection process determines which portion of which of the reference video streams is/are deemed to be found in the query video stream 200.

To this end, the content-based video copy detection process includes a feature extraction sub-process, a nearest-neighbor matching sub-process and a comparison sub-process.

Feature Extraction Sub-Process

In general, video features can be extracted either globally or locally. Global feature extraction can yield keyframes, which are frames that represent rapid temporal change. For example, on an average one or several keyframe may be extracted per second of video. The keyframe contains both the feature's position and value; and is not extracted at regular intervals. On the other hand, local features can be extracted from each frame.

Those skilled in the art will appreciate that it is possible to divide the frame into regions. The local features can be encoded as "(value, position)" pairs. The "position" of the local feature refers to a region of the frame where the local feature occurs. The "value" of the local feature may be a quantized value (where the value is restricted to a relatively small number of bins) or an unquantized value (e.g., floating point).

Those skilled in the art will also appreciate that it is possible to extract local features for all of the regions of a frame, or only for a certain number of regions of the frame that have the greatest temporal variation. Consider the case where only the top, say, seven (7) most temporally varying local features are extracted out of a total of, say, sixteen (16) regions (other breakdowns having more or fewer regions are of course possible). It will be appreciated that the 7 positions containing the local features extracted from one frame may not be the same 7 positions containing the local features extracted from the next frame. As such, consecutive frames may represent values for up to 7 different positions.

In order for nearest-neighbor matching sub-process (see further details later on) to be able to search successfully for a video copy, the following two conditions are sought, which are particular to video: the frames are to be sampled uniformly (e.g., every frame), and the features for each frame are to come from the same position. As such, the feature extraction sub-process of certain embodiments of the present invention seeks to include a "(value-position)" pair for each position in the frame, even if only a smaller number of highly temporally variable features are actually extracted per frame. As a result, certain positions for which no feature was actually extracted will include "dummy information" or "placeholder data".

Accordingly, as part of the feature extraction sub-process, a set of feature parameters is computed for each video frame in the query video stream 200 and for each video frame in each of the reference video streams. Specifically, in the case of reference video stream 222$_i$, the feature extraction sub-process can be carried out to compute the reference data elements 230$_i$-1, 230$_i$-2, ..., 230$_i$-T; for respective ones of the video frames in reference video stream 222$_i$. The feature extraction sub-process can also be carried out to compute data elements (referred to for clarity as "query data elements") 201-1, 201-2, ..., 201-Q for respective ones of the video frames 200-1, 200-2, ..., 200-Q in the query video stream 200. Thus, each of the query data elements 201-1, 201-2, ..., 201-Q will include a set of feature parameters derived for a respective one of the video frames 200-1, 200-2, ..., 200-Q. The set of feature parameters derived for a particular video frame may be derived from the particular video frame and/or from one or more frames in the neighborhood of that particular video frame.

Those skilled in the art will appreciate that the feature extraction sub-process can be carried out for the query video stream 200 after receipt thereof, and can be carried out for the reference video streams 222 in a prior stage (e.g., before receipt of the query video stream 200).

In order to describe the feature extraction sub-process in greater detail, it is noted that a given video frame can include intensity values of a set of pixels. In the case of component video (e.g., RGB, YCbCr), several intensity values are associated with each pixel. The intensity values may include a single component. For example, video in certain medical, security, military or astronomical applications may include monochromatic (e.g., grey-scale) pixels. In another example, the pixels may each include multiple components. This would be the case with component video (e.g., RGB, YCbCr), where several intensity values are associated with each pixel.

For notational convenience, one can let $v_c(p, t)$ represent RGB value of a pixel in a given video frame from which one desires to extract a set of feature parameters, at time t, where p=pixel coordinate and c is an element of the set $\{R,G,B\}$. Now, in order to extract a non-limiting example set of feature parameters from the given video frame, the given video frame can be divided into 16 sub-squares, and the raw RGB value $x_c(i, t)$ in each square is computed as:

$$x_c(i, t) = \frac{1}{|I_i|} \sum_{p \in I_i} v_c(p, t),$$

where $I_i$ (i=1, 2, ..., 16) is a whole set of pixels in the $i^{th}$ sub image.

Temporally normalized feature parameters $y_c(i, t)$ are then computed from $x_c(i, t)$ using an M-frame window as follows:

$$y_c(i, t) = \frac{1}{\sigma_c(i, t)}(x_c(i, t) - \mu_c(i, t)), \text{ where}$$

$$\mu_c(i, t) = \frac{1}{M} \sum_{j=-[M/2]}^{M-[M/2]-1} x_c(i, t+j), \text{ and}$$

$$\sigma_c(i, t) = \left(\frac{1}{M} \sum_{j=-[M/2]}^{M-[M/2]-1} (x_c(i, t+j) - \mu_c(i, t))^2\right)^{1/2}$$

are average and standard deviation computed over a time window of M video frames (i.e., this computation involves nearby video frames). The value of M is not particularly limited, and in a non-limiting example M may be equal to ten (10). The temporally normalized feature parameters $y_c(i, t)$ are computed for all 16 positions and for each video component (if more than one).

In a first variant of the feature extraction sub-process, the 16 $y_c(i, t)$ values represent the set of feature parameters for the given video frame. Each of the 16 $y_c(i, t)$ values can then be stored as an unquantized (e.g., floating point) or quantized (e.g., non-floating point) value. A first set of results below stems from the case where each of the 16 $y_c(i, t)$ values are stored as floating point values. It should therefore be appreciated that there are 3×16=48 "(value, position)" pairs extracted per video frame (i.e., three colors times sixteen positions) in the first variant.

In a second variant of the feature extraction sub-process, a limited number of feature parameters that have, e.g., the largest deviation from the temporal mean, are chosen for the given video frame. For example, a certain number (e.g., seven (7), but this number could be larger or smaller) of values of i could be chosen that have the maximum values for $z_c(i, t)$, where:

$$z_c(i,t)=|(x_c(i,t)-\mu_c(i,t))|.$$

Each of these seven (7) chosen $x_c(i, t)$ values can then be stored as an unquantized (e.g., floating point) or quantized value. A second set of results below stems from the case where each of the 7 chosen $x_c(i, t)$ values is quantized between 0 and 5 and then stored as a "(value, position)" pair. The seven (7) quantized feature parameters $x_c(i, t)$ are computed for each video component, to yield the set of feature parameters for the given video frame. It should therefore be appreciated that there are 3×7=21 "(value, position)" pairs extracted per video frame (i.e., three colors times seven positions) in the second variant.

Of course, it should be appreciated that other feature parameters and methods for obtaining them can be used, leading to other variants of the feature extraction sub-process.

It should be appreciated that in a multi-component video environment, sets of feature parameters may, but do not need to, be derived for each component, for each video frame. Thus, in the case of a RGB implementation, it is feasible to derive three (3) sets of feature parameters for each video frame (one for each of the R, G and B components), whereas in the case of a YCbCr implementation, it is feasible to derive a single set of feature parameters for each video frame (for the Y component).

Nearest-Neighbor Matching Sub-Process

Having extracted sets of feature parameters using the feature extraction sub-process, the nearest-neighbor matching sub-process can be carried out to associate each of the reference data elements in each of the reference sequences 220 with a "representative query data element identifier", also referred to herein as a "fingerprint".

Figure 3:
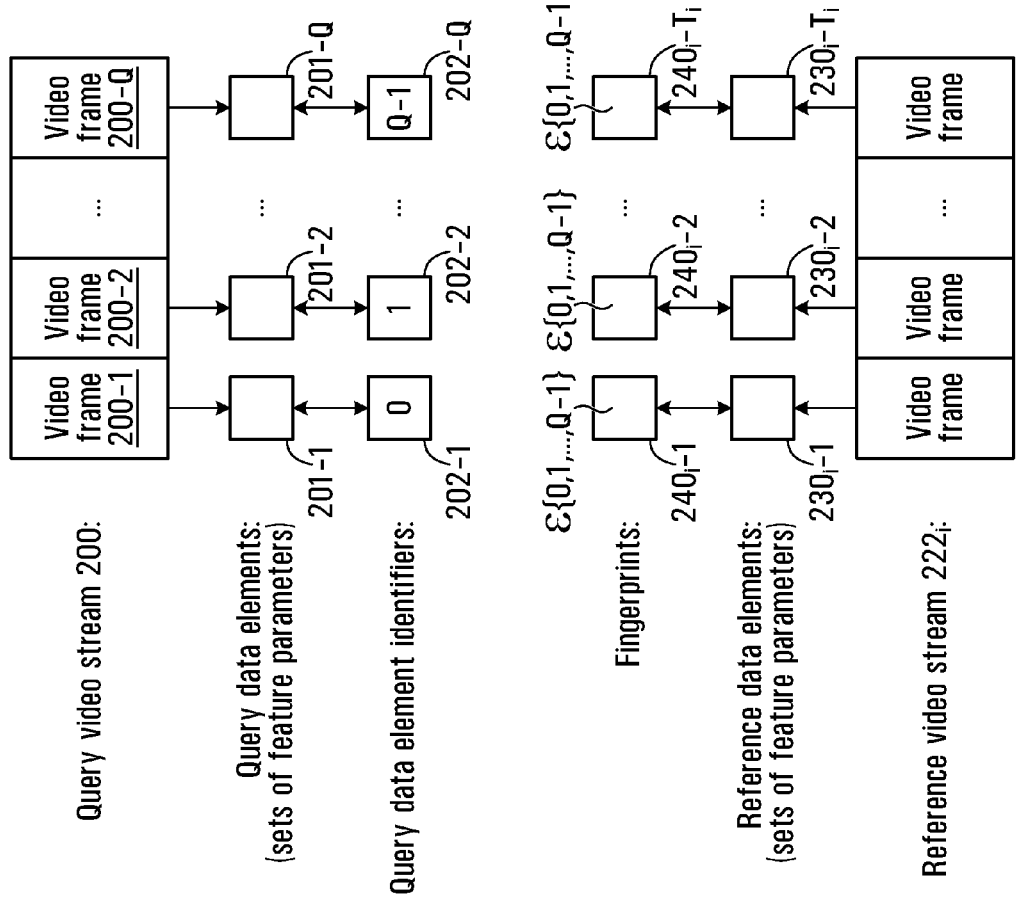
FIG. 3 is a diagram that conceptually illustrates a nearest-neighbor matching sub-process, which forms part of the content-based video copy detection process, in accordance with a specific non-limiting embodiment of the present invention.

By way of example, and with reference to FIG. 3, consider reference sequence $220_i$ that is made up of reference data elements $230_i\text{-}1$, $230_i\text{-}2$, ..., $230_i\text{-}T_i$. With each of the reference data elements $230_i\text{-}1$, $230_i\text{-}2$, ..., $230_i\text{-}T_i$ is associated a fingerprint $240_i\text{-}1$, $240_i\text{-}2$, ..., $240_i\text{-}T_i$. The fingerprint for a given reference data element is the identifier used to identify the one query data element (among the query data elements 201-1, 201-2, ..., 201-Q) found to most "closely" match the given reference data element.

For instance, assume that the query data elements 201-1, 201-2, ..., 201-Q are identified by respective query data element identifiers 202-1, 202-2, ..., 202-Q. In a simple non-limiting example, the query data element identifiers 202-1, 202-2, ..., 202-Q can be sequence numbers (e.g., 0, 1, 2, 3, ..., (Q−1)), but it should be understood that in other embodiments, the query data element identifiers 202-1, 202-2, ..., 202-Q may be memory addresses, names or system-defined identifiers. It should thus be apparent that each of the fingerprints $240_i\text{-}1$, $240_i\text{-}2$, ..., $240_i\text{-}T_i$ is in fact one of the query data element identifiers 202-1, 202-2, ..., 202-Q, determined according to the nearest-neighbor matching sub-process.

With continued reference to FIG. 3, the set of feature parameters in a first reference data element $230_i\text{-}1$ (forming part of reference sequence $220_i$) is compared to each of the sets of feature parameters in query data elements 201-1, 201-2, ..., 201-Q in order to determine which is "closest". The query data element identifier of the query data element having the closest set of feature parameters to the set of feature parameters in reference data element $230_i\text{-}1$ is then selected as fingerprint $240_i\text{-}1$. The same computation is performed for a second reference data element $230_i\text{-}2$, such that the query data element identifier of the query data element having the closest set of feature parameters to the set of feature parameters in reference data element $230_i\text{-}2$ is then selected as fingerprint $240_i\text{-}2$, and so on.

To compute a fingerprint when the first variant of the feature extraction sub-process is used, the absolute sum S between a reference data element denoted t and a query data element denoted k can be computed as:

$$S = \sum_{i=0}^{15} |(y_c(i, t) - q_c(i, k))|$$

where $y_c(i, t)$ is the value in position i for the reference data element t and $q_c(i, k)$ is the value in position i for the query data element k (in the first variant described above, these values were unquantized).

To compute the closest query data element when the second variant of the feature extraction sub-process is used, the aforementioned seven (7) "(value, position)" pairs are augmented by "(−1, position)" for all the missing positions. In other words, dummy "(value, position)" pairs are inserted into the positions that do not include an extracted feature. This ensures that there will be a "(value, position)" pair for each position of each frame, which facilitates computation of the nearest-neighbor matching sub-process. In this case, the absolute sum S between the reference data element t and the query data element k is computed as:

$$S = \sum_{i=0}^{15} |(y'_c(i, t) - q'_c(i, k))|$$

where $y'_c(i, t)$ is the quantized value of $y_c(i, t)$ in position i for the reference data element t, and $q'_c(i, k)$ is the quantized value in position i for query data element k (in the second variant described above, these values were quantized and therefore are appended with a "prime" symbol).

The representative query data element identifier for the reference data element t (referred to as the "nearest neighbor", or "fingerprint") is the query data element identifier k that gives the lowest sum S (for either variant of the feature extraction sub-process, as the case may be).

It should be appreciated that the nearest-neighbor matching sub-process can be independently replicated for each video component of a component video signal (i.e., for each of R, G and B for an RGB signal; for each of Y, Cb and Cr for a YCbCr signal; etc.). Also, it should be appreciated that other distance metrics can be used to evaluate which query data element has the closest set of feature parameters to the set of feature parameters in reference data element $230_i\text{-}1$.

The above nearest-neighbor matching sub-process is carried out for the other reference data elements $230_i\text{-}2$, $230_i\text{-}3$, ... $230_i\text{-}T_i$ in reference sequence $220_i$ and then for each of the reference data elements in each of the other reference sequences 220.

Since the nearest-neighbor matching sub-process can be computationally intensive, one may note that the search for the query data element nearest to each reference data element can be carried out independently for multiple reference data elements. Consequently, an alternate processor that is specialized in parallel computations may be used to outperform the speed offered by a modern CPU. To this end, the GPU 18 can be used. The GPU 18 can be a Single Instruction, Multiple Data (SIMD) parallel processor that is computationally powerful, while being quite affordable.

One possible approach to compute the nearest-neighbor fingerprints is to use CUDA, a development framework for NVidia graphic cards (see http://www.nvidia.com/object/cuda_home.html). The CUDA framework models the graphic card as a parallel coprocessor for the CPU. The development language is C with some extensions.

A program in the GPU is called a kernel and several programs can be concurrently launched. A kernel is made up of configurable amounts of blocks, each of which has a configurable amount of threads. At execution time, each block is assigned to a multiprocessor. More than one block can be assigned to a given multiprocessor. Blocks are divided in groups of 32 threads called warps. In a given multiprocessor, 16 threads (half-warp) are executed at the same time. A time slicing-based scheduler switches between warps to maximize the use of available resources.

The GPU 18 utilizes the GPU memory 20, which can include global memory that is accessible by all multiprocessors. Since this memory is not cached, it is beneficial to ensure that the read/write memory accesses by a half-warp are coalesced in order to improve the performance. The texture memory is a component of the global memory which is cached. The texture memory can be efficient when there is locality in data.

The GPU memory 20 may also include shared memory which is internal to multiprocessors and is shared within a block. This memory, which is considerably faster than the global memory, can be seen as user-managed cache. The shared memory is divided into banks in such a way that successive 32-bit words are in successive banks. To be efficient, it is important to avoid conflicting accesses between threads. Conflicts are resolved by serializing accesses; this incurs a performance drop proportional to the number of serialized accesses.

Figure 4:
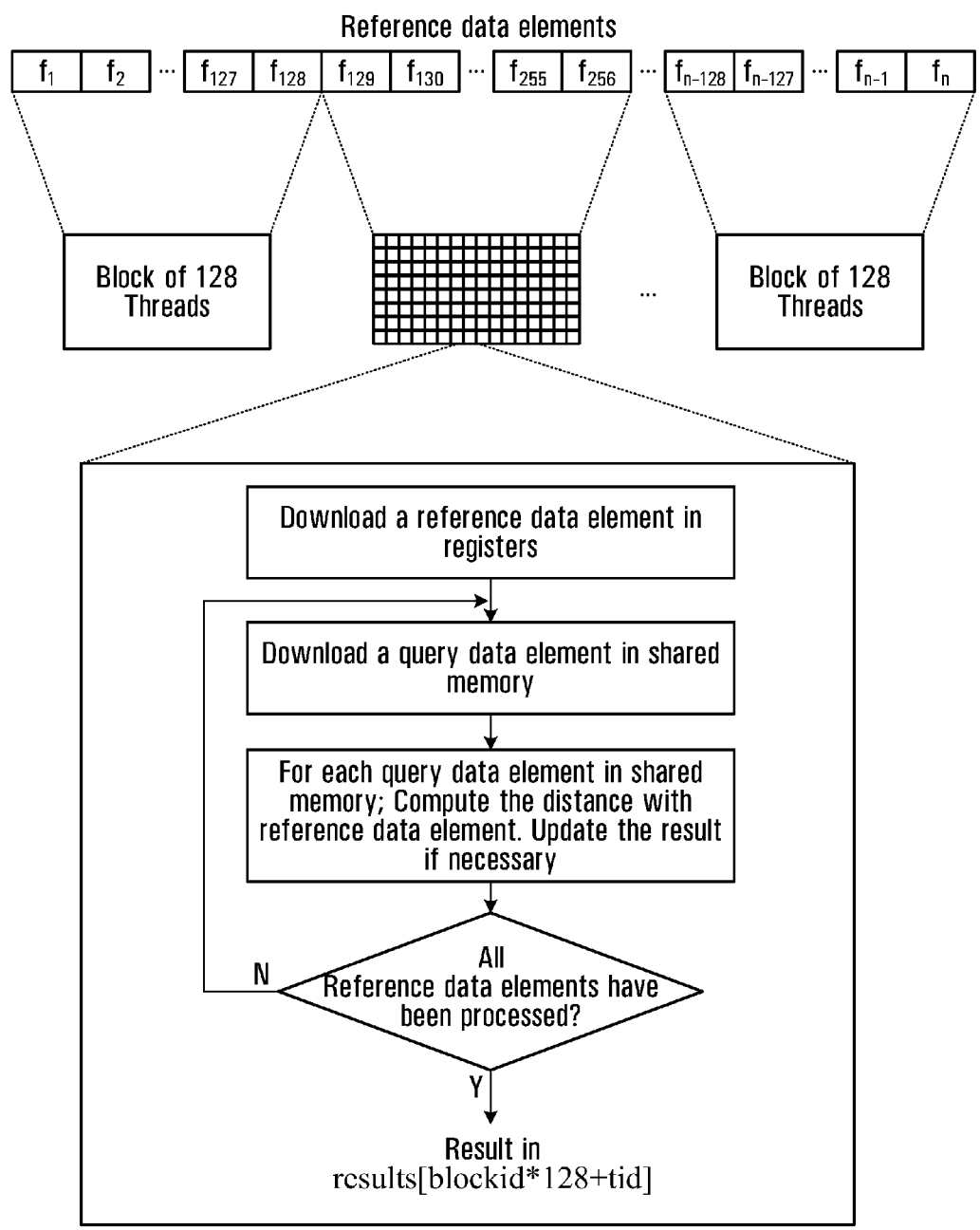
FIG. 4 conceptually illustrates implementation of the nearest-neighbor matching sub-process using a graphics processing unit, in accordance with a specific non-limiting embodiment of the present invention.

FIG. 4 illustrates how fingerprints could be calculated using the GPU 18. In FIG. 4, tid denotes the thread identifier for which the range is [0 . . . n], where n is the number of threads in the block. The value of blockId has the same meaning for all the blocks. In this case, the number of blocks is the number of segment frames divided by 128. The number 128 has been chosen to ensure that all the shared memory is used and to ensure efficient transfer of data from the global memory to the shared memory.

As a first step, the reference data elements are divided into sets of 128 reference data elements. Each set is associated with a multiprocessor running 128 threads. Thus, each thread computes the closest query data element for its associated reference data element. Each thread in the multiprocessor downloads one reference data element from global memory. At this time, each thread can compute the distance between its reference data element and all of the 128 query data elements now in shared memory. Once all threads are finished, the next 128 reference data elements are downloaded and the process is repeated.

To increase performance even further, it is possible to concurrently process several reference data elements and/or query data elements.

Comparison Sub-Process

Having carried out the nearest-neighbor matching sub-process for the reference data elements in each of the reference sequences 220, the comparison sub-process begins by identifying, for each given reference sequence, a plurality of time-shifted subsets of reference data elements (such subsets being hereinafter referred to as "snippets") within the given reference sequence. The comparison sub-process involves a first stage, which is performed for each snippet in a given reference sequence and produces a "similarity measure" for the given reference sequence. During the first stage, for each given snippet of a given reference sequence, an element-by-element comparison is performed between the fingerprints associated with the reference data elements forming part of the given snippet and the query data element identifiers 202-1, 202-2, . . . , 202-Q. The comparison sub-process also involves a second stage, which is performed on the similarity measures, with the aim of identifying a single one of the snippets (referred to as the "best matching segment") for the given reference sequence. Finally, the comparison sub-process involves a third stage, during which the similarity measures for the best matching segment for each of the reference sequences are compared, thereby deeming zero, one or more of the best matching segments as being present in the query video stream 200.

Figure 5A:
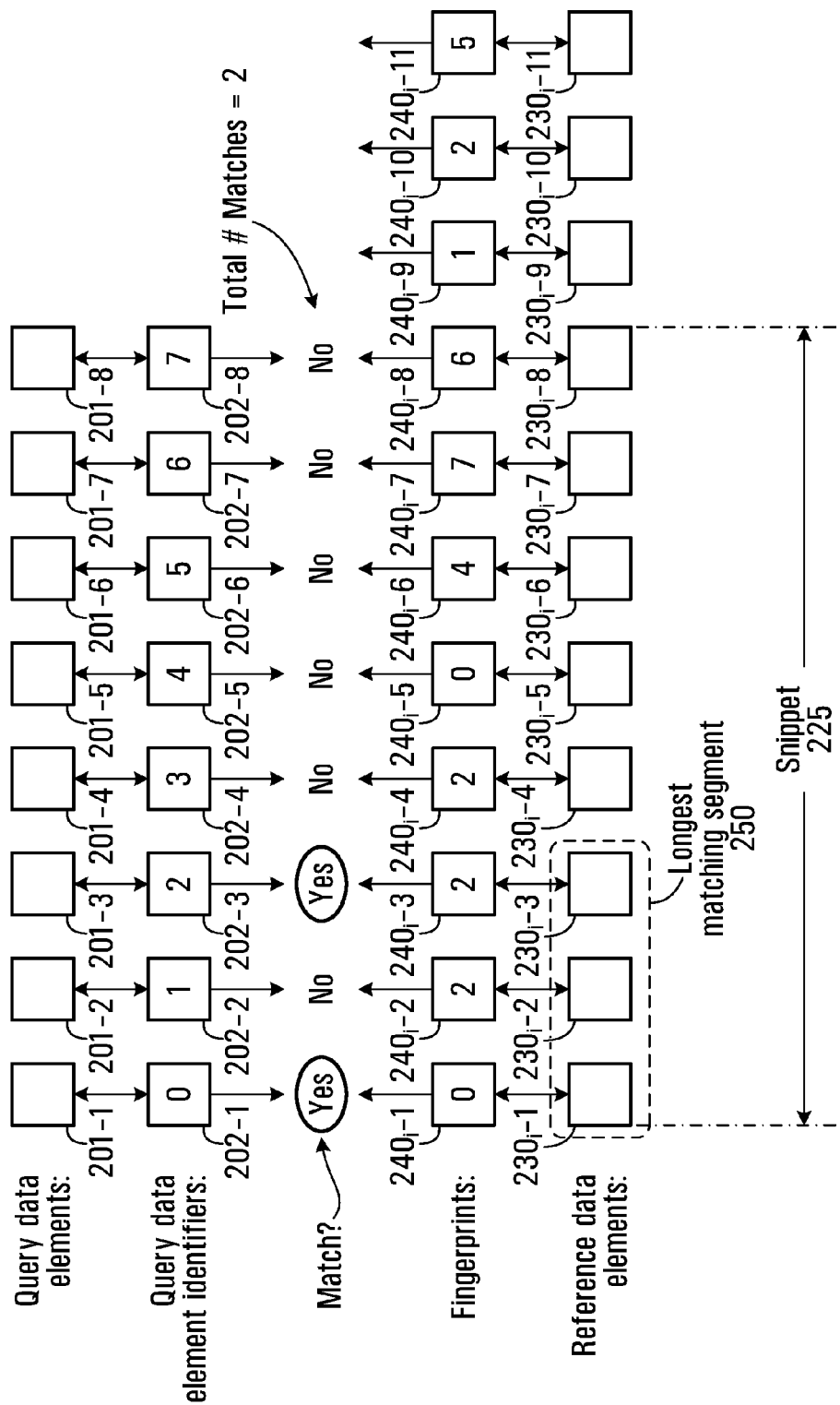
FIGS. 5A and 5B are a diagrams that conceptually illustrate a comparison sub-process, which forms part of the content-based video copy detection process, in accordance with a specific non-limiting embodiment of the present invention.
Figure 5B:
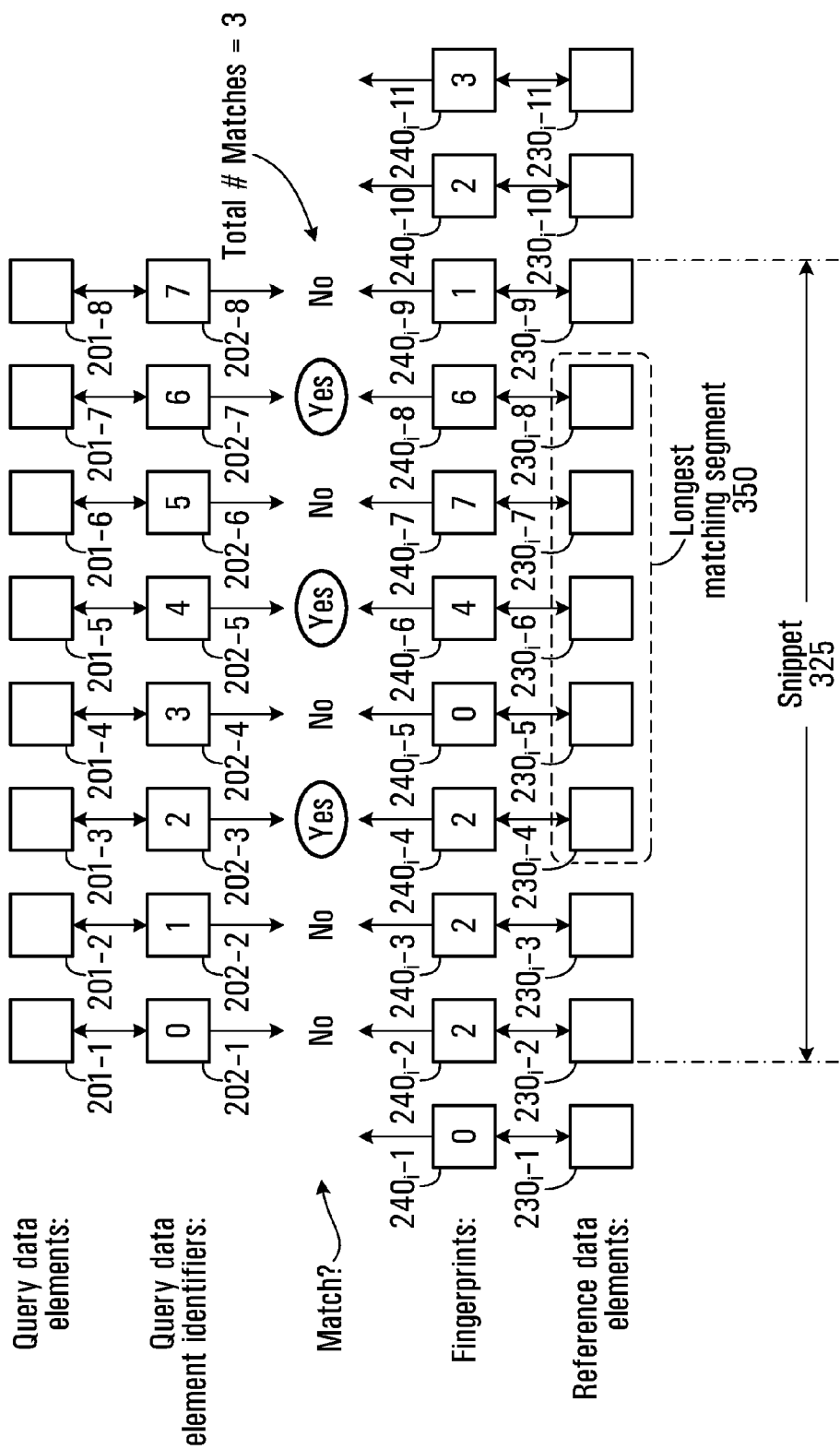

Turning to the first stage of the comparison sub-process, reference is made to FIGS. 5A and 5B, which show a specific non-limiting example method for obtaining similarity measures for two particular snippets 225, 335 of reference sequence $220_i$. Here, reference sequence $220_i$ includes eight (i.e., Q=8) query data elements 200-1, 200-2, . . . , 200-8, and the query data element identifiers 202-1, 202-2, . . . , 202-8 have the values 0 1, 2, 3, 4, 5, 6 and 7, respectively. In this simple example, the query data element identifiers 202-1, 202-2, . . . , 202-8 represent the positions of the query data elements 200-1, 200-2, . . . , 200-8 which, it will be recalled, can be derived from video frames 200-1, 200-2, . . . , 200-Q in the query video stream 200 using the feature extraction sub-process. In addition, reference sequence $220_i$ includes eleven (i.e., T=11) reference data elements $230_i$-1, $230_i$-2, . . . , $230_i$-11, which were similarly derived using the feature extraction sub-process.

Continuing with the example of FIGS. 5A and 5B, a nearest-neighbor matching sub-process (described previously) is assumed to have been carried out, in order to associate each of the reference data elements $230_i$-1, $230_i$-2, . . . , $230_i$-11 with a respective fingerprint $240_i$-1, $240_i$-2, . . . , $240_i$-11. In this case, it is assumed that the nearest-neighbor matching sub-process has produced the following respective values for the fingerprints $240_i$-1, $240_i$-2, . . . , $240_i$-11: 0, 2, 2, 2, 0, 4, 7, 6, 1, 2, 5. For the purposes of the present non-limiting example, only a single video component is considered but it will be understood that analogous computations can be independently replicated for each video component of a component video signal.

Two example snippets 225, 325 are identified in reference sequence $220_i$. For the purposes of the present non-limiting example, snippet 225 (in FIG. 5A) encompasses Q=8 reference data elements of reference sequence $220_i$, starting with reference data element $230_i$-1. That is to say, snippet 225 encompasses the eight (8) reference data elements $230_i$-1, $230_i$-2, . . . , $230_i$-8, which are respectively associated with the eight (8) fingerprints $240_i$-1, $240_i$-2, . . . , $240_i$-8 having respective values 0, 2, 2, 2, 0, 4, 7 and 6. For its part, snippet 325 (in FIG. 5B) encompasses Q=8 reference data elements of reference sequence $220_i$, starting with reference data element $230_i$-2. That is to say, snippet 325 encompasses the eight (8) reference data elements $230_i$-2, $230_i$-3, . . . , $230_i$-9, which are respectively associated with the eight (8) fingerprints $240_i$-2, $240_i$-3, . . . , $240_i$-9 having respective values 2, 2, 2, 0, 4, 7, 6 and 1.

Referring to FIG. 5A, a similarity measure for snippet 225 is now computed by comparing the fingerprints $240_i$-1, $240_i$-2, . . . , $240_i$-8 to the query data element identifiers 202-1, 202-2, . . . , 202-8 on an element-by-element basis. Specifically, a correspondence (or alignment) is established between the query data element identifiers 202-1, 202-2, ..., 202-8 and the fingerprints $240_i$-1, $240_i$-2, ..., $240_i$-8, respectively. An incidence of matches between aligned element pairs is determined and recorded. In this specific case, it will be apparent that two (2) query data element identifiers 202-1 and 202-3 match with their corresponding fingerprints $240_i$-1 and $240_i$-3, respectively.

FIG. 5B shows the situation for snippet 325, which is shifted relative to snippet 225 by one data element position. Accordingly, a similarity measure is computed by comparing the fingerprints $240_i$-2, $240_i$-3, ..., $240_i$-9 to the query data element identifiers 202-1, 202-2, ..., 202-8 on an element-by-element basis. Specifically, a correspondence (or alignment) is established between the query data element identifiers 202-1, 202-2, ..., 202-8 and the fingerprints $240_i$-2, $240_i$-3, ..., $240_i$-9, respectively. An incidence of matches between aligned element pairs is determined and recorded. In this specific case, it will be apparent that three (3) query data element identifiers 202-3, 202-5 and 202-7 match with their corresponding fingerprints $240_i$-4, $240_i$-6 and $240_i$-8, respectively.

Generally speaking, when determining an incidence of matches between aligned pairs of query data element identifiers and fingerprints for a given snippet of reference sequence $220_i$, various outcomes are possible. For example, it is possible that none of the aligned pairs of query data element identifiers and fingerprints will match. This fact could be recorded as a similarity measure (or indeed a measure of non-similarity) in association with the given snippet. Alternatively, it is possible that only a single one of the query data element identifiers, say 202-$m$ will match with its aligned fingerprint, say $240_i$-n, for a given snippet. The identity of the matching query data element identifier 202-$m$, as well as the identity of the reference data element $230_i$-n associated with fingerprint $240_i$-n, could be recorded as a similarity measure in association with the given snippet of reference sequence $220_i$.

Finally, it is possible that two or more aligned pairs of query data element identifiers and fingerprints will match for a given snippet (e.g., as was the case with snippets 225 and 325). In this case, the segment of the reference sequence $220_i$ that is bound by the two most extreme reference data elements for which a match has been found (e.g., $230_i$-a and $230_i$-b) is referred to as a "longest matching segment" for the given snippet. The total number of matches (which is in this case at least as great as 2), as well as the size of the longest matching segment (which will generally be equal to ((b−a)+1)), the boundaries of longest matching segment (namely, reference data elements $230_i$-a and $230_i$-b) and/or the query data element identifiers (say, query data element identifiers 202-$c$ and 202-$d$) corresponding to the longest matching segment, could be recorded as a similarity measure in association with the given snippet of reference sequence $220_i$.

Considering now the specific non-limiting example of FIG. 5, the "longest matching segment" for snippet 225 is the portion 250 of reference sequence $220_i$ that is bound by the two most extreme reference data elements for which a match has been found (namely reference data elements $230_i$-1 and $230_i$-3). Accordingly, a similarity measure in association with snippet 225 (which could be stored in the memory 16) may be one or more of: the total number of matches (which is in this case two (2)), as well as the size of the longest matching segment (which is in this case three (3)), the boundaries of longest matching segment of snippet 225 (namely, reference data elements $230_i$-4 and $230_i$-8) and/or the query data element identifiers corresponding to the longest matching segment (namely, query data element identifiers 202-3 and 202-5).

As for snippet 325, the "longest matching segment" for snippet 325 is the portion 350 of reference sequence 220, that is bound by the two most extreme reference data elements for which a match has been found (namely reference data elements $230_i$-4 and $230_i$-8). Accordingly, a similarity measure in association with snippet 225 (which could be stored in the memory 16) may be one or more of: the total number of matches (which is in this case three (3)), as well as the size of the longest matching segment (which is in this case five (5)), the boundaries of longest matching segment of snippet 325 (namely, reference data elements $230_i$-4 and $230_i$-8) and/or the query data element identifiers corresponding to the longest matching segment (namely, query data element identifiers 202-4 and 202-8).

Those skilled in the art will appreciate that when, as in the case of component video, fingerprints are independently determined and associated for each video component, the incidence of matches can be determined and recorded for each video component separately.

The above process is repeated for all ($T_i$−Q+1) snippets that can be produced from reference sequence $220_i$. The starting reference data element for each new snippet will be the immediately succeeding reference data element in reference sequence $220_i$, so as to eventually compare all Q-length subsequences of fingerprints against the ensemble of query data element identifiers 202-1, 202-2, ..., 202-Q. This can be done algorithmically in an efficient manner so that only one addition per reference data element is involved. For more information about the algorithm and its computational efficiencies, one may consult the paper entitled "CRIM's content-based audio copy detection system for TRECVID 2009", published in Multimedia Tools and Applications, Springer Netherlands, DOI: 10.1007/s11042-010-0608-x, hereby incorporated by reference herein.

With regard to the second stage of the comparison sub-process, the snippet that produced the longest "longest matching segment" is identified. Such snippet is referred to as the "best matching segment" for reference sequence $220_i$. Thereafter, a new reference sequence is selected from among the reference sequences 220 and the above process is repeated for the new reference sequence. In an exhaustive search, each of the reference sequences is subjected to the above process, until best matching segments have been obtained for all the reference sequences 220.

With regard to the third stage of the comparison sub-process, the best matching segments for each of the various reference sequences 220 (obtained during the second stage of the comparison sub-process) are assessed using the similarity measures associated with those best matching segments (obtained during the first stage of the comparison sub-process). By virtue of a particular portion of a particular reference video stream being identified by a particular snippet of that reference video stream's reference sequence, it is possible to conclude, based on the similarity measures obtained associated with the particular snippet, whether a copy of the particular portion of the particular video stream exists in the query video stream 200.

There are a variety of possible implementations for concluding the presence of a copy based on similarity measures. For example, it is possible to identify as potentially copied snippets only those snippets of reference sequences for which the similarity measures meet certain pre-determined criteria in terms of the total number of matches. To this end, it is recalled that a match refers to the case when a query data element identifier matches the corresponding fingerprint, for a given snippet of a given reference sequence. When the total number of matches is large, this may imply that there is a greater correlation between the query video stream 200 and the corresponding portion of the corresponding reference video stream than when the number of matches is low. It may therefore be possible to establish a threshold above which a certain total number of matches is considered a reliable indicator of a copy.

In another embodiment, it is possible to identify as potentially copied snippets only those snippets of reference sequences for which the similarity measures meet certain pre-determined criteria in terms of match density. Specifically, for the same total number of matches, it may be plausible to conclude that the query video stream 200 is poorly correlated with the corresponding portion of the corresponding reference video stream when the matches are more spread out (i.e., a longer "longest matching segment"), whereas the query video stream 200 would be considered to be highly correlated with the corresponding portion of the corresponding reference video stream when the same overall number of matches are less spread out (i.e., a shorter "longest matching segment").

In yet another embodiment, the total number of matches and the length of the longest matching segment may both be taken into account. To this end, it may be possible to identify as potentially copied snippets only those snippets of reference sequences for which both the average number of matches per time base (e.g., per second) and the length of the longest matching segment exceed respective thresholds.

It should be appreciated that in the case of component video, similarity measures can be obtained for each video component separately and different thresholds may be applied to the similarity measures for different video components. The outcomes may then be combined in order to conclude whether the query video stream 200 includes a copy of at least a portion of a particular reference video stream. Alternatively, the similarity measures for several video components may be combined into a composite set of similarity measures for a given snippet of a given reference sequence, and this composite set can be compared against a threshold in order to infer whether the query video stream 200 includes a copy of at least a portion of a particular reference video stream.

Those skilled in the art will appreciate that there may be other ways of processing the similarity measures to arrive at a conclusion about the presence or absence of a copy of at least a portion of at least one reference video stream in the query video stream 200. One should also note the possibility that the content-based video copy detection process may output the conclusion that the query video stream 200 does not appear to contain a copy of any significant portion of any reference video stream.

The output of the content-based video copy detection process (which can specify portions of reference video streams for which copies are deemed to appear in the query video stream 200), can be provided in a variety of ways. For example, the output of the content-based video copy detection process can be stored in the memory 16, modulated into a signal or encoded into packet that is transmitted over a network such as the Internet, displayed on a screen, trigger an alarm, etc. In an example case where the reference video streams are advertisements intended for television, the output of the content-based video copy detection process can be used to monitor the frequency of occurrence of the television advertisements in the television broadcast (query video stream). In another example case where the reference video streams are copyright motion pictures, the output of the content-based video copy detection process can be used to detect the infringement of copyright (pirating) in movies distributed by a particular online source (query video stream). Other practical applications can of course be envisaged and are within the scope of the present invention.

Results

The data for video copy detection for TRECVID 2009 comes from NIST sponsored TRECVID 2008 and 2009 CBCD evaluations (see "Guidelines for the TRECVID 2009 Evaluation" 2009, www-nlpir.nist.gov/projects/tv2009/and W. Kraaij, G. Awad, and P. Over, "TRECVID-2008 Content-based Copy Detection", www-nlpir.nist.gov/projects/tvpubs/tv8.slides/CBCD.slides.pdf, incorporated by reference herein). The query video streams are from the TRECVID 2009 evaluations. In TRECVID 2009, there were 201 original query video streams transformed 7 different ways, namely using Transforms 2, 3, 4, 5, 6, 8 and 10 in Table 1 below:

TABLE 1

| Transform | Description |
| --- | --- |
| T1 | Cam Cording |
| T2 | Picture in Picture (PIP) Type 1: original video in front of background video |
| T3 | Insertions of pattern |
| T4 | Strong re-encoding |
| T5 | Change of gamma |
| T6, T7 | Decrease in quality: blur, gamma, frame dropping, contrast, compression, ratio, white noise |
| T8, T9 | Post production transforms: crop, shift, contrast, caption, flip, insertion of pattern, PIP type 2 |
| T10 | Combination of everything |

Each reference video stream is supposed to occur one or zero times in the query video stream. The reference set used for the TRECVID 2009 copy detection evaluations consists of a total of 385 hours of video. For the 2010 TRECVID copy detection evaluations, the reference set consists of roughly 12000 videos from internet archives for a total of 400 hours of video. There are 201 original queries (different from 2009) transformed 8 different ways, namely using Transforms 1 2 3 4 5 6 8 10 in Table 1 above.

TRECVID 2009

Table 2 below illustrates minimal normalized detection cost rate (NDCR) for optimal no false alarm (FA) for both the quantized and unquantized feature cases for transforms 3, 4 and 5:

TABLE 2

| | Transform | | |
| --- | --- | --- | --- |
| | 3 | 4 | 5 |
| quantized features | .007 | .082 | 0.0 |
| unquantized features | 0.0 | .037 | 0.0 |

It is noted that the content-based video copy detection process performs well in part due to the nearest-neighbor matching sub-process. This is because when the portion of a query video stream aligned with a particular snippet does contain the corresponding portion of a reference video stream encompassed by the particular snippet, there will be a high correlation (i.e., high match count) between the fingerprints associated with the reference data elements encompassed by the particular snippet and the query data element identifiers. On the other hand, when the portion of a query video stream aligned with a particular snippet does not contain the corresponding portion of a reference video stream encompassed by the particular snippet, the fingerprints associated with the reference data elements encompassed by the particular snippet will be random, leading to a low match count.

It will be appreciated that the reference video streams may potentially go through many transforms which affect the position of the feature parameters in the query video stream 200. Thus, one can envisage performing the nearest-neighbor matching sub-process for the original set of feature parameters obtained from the query video stream as well as for a plurality of derivative feature sets, where each derivative feature set is derived from having processed the query video stream using a transform, such as "flip" and "picture-in-picture" (PIP). For the flip transform, the 16 feature vectors of each frame in the original query video stream were flipped. This leads to two derivative sets of feature parameters per original query video stream: flipped and unflipped feature parameters. Each set of feature parameters is searched independently. Similarly, there were 5 picture-in-picture (PIP) positions (upper left, upper right, lower left, lower right, and center), and for each PIP position, there were three different sizes (0.5, 0.4, 03). This leads to 15 additional derivative feature sets for each of the flipped and non-flipped positions. So all together, 32 different derivative sets of feature parameters were generated per original frame that are searched independently. The longest matching segment (obtained using the nearest-neighbor matching process) was identified and retained. Because of the flip and picture-in-picture transforms, the search is 32 times slower than in the absence of any transforms.

The content-based video copy detection process using a set of 16 floating-point temporally normalized unquantized features per frame was run on 1407 queries and 385 hours of reference video from TRECVID 2009 CBCD evaluations. The min NDCR for the optimized no false-alarm case (Rtarget=0.5/hr, CMiss=1, CFA=1000) are shown in Table 3 below:

TABLE 3

| | Transform | | | | | |
|---|---|---|---|---|---|---|
| | 2 | 3 | 4 | 5 | 6 | 8 | 10 |
| min NDCR | .022 | 0 | .052 | 0 | 0 | .037 | .097 |

It is noted that when we search 32 sets of features (Table 3) instead of one (Table 2), the min NDCR for transform 4 goes up from 0.037 to 0.052. The min NDCR for transforms 3 and 5 remains unchanged.

The min NDCR achieved using the content-based video copy detection process can be contrasted with the min NDCR achieved for audio copy detection for the same task, as published in V. Gupta, G. Boulianne, P. Cardinal, "CRIM's content-based audio copy detection system for TRECVID 2009", Multimedia Tools and Applications, 2010, Springer Netherlands, pp. 1-17, DOI: 10.1007/s11042-010-0608-x, the results of which are reproduced below in Table 4 for comparison purposes:

TABLE 4

| | Transform | | | | | | |
|---|---|---|---|---|---|---|---|
| | 1 | 2 | 3 | 4 | 5 | 6 | 7 |
| min NDCR | .052 | .052 | .067 | .06 | .052 | .067 | .075 |

It will be observed that min NDCR for video copy detection is significantly better than the min NDCR achieved for audio copy detection for the same task, with the exception of Transform 10.

TRECVID 2010

The TRECVID 2010 CBCD evaluations reference set consists of completely new videos collected from the web. This new set of videos is characterized by a high degree of diversity in creator, content, style, production qualities, original collection device/encoding, language, etc., as is common in much of web video. By comparison, in 2009, there were 838 reference video files for a total of 385 hours of video, whereas in 2010, there are over 12000 files for a total of 400 hours of video. In other words, these videos are in general less than 4.1 minutes in duration. Many of these videos are slide shows with varying durations of each slide. In compiling the copy detection results, it was noticed that there were many duplicate reference files for many queries: To compile the results correctly, these duplicate files were removed. The final results using the unquantized 16 features per frame (using the nearest-neighbor matching process) are shown in Table 5 below:

TABLE 5

| | Transform | | | | | | |
|---|---|---|---|---|---|---|---|
| | 1 | 2 | 3 | 4 | 5 | 6 | 8 | 10 |
| min NDCR | .6 | .417 | .04 | .18 | .03 | .142 | .187 | .27 |

As can be seen from Table 5, the min NDCR is significantly worse for 2010 data than for 2009 data. The reason is simple. In 2009 videos, there are no slide shows, while 2010 data has several slide shows. The feature parameters used are based on temporal variability. When there is no temporal variability, then the features are either zero or one. This leads to many more false matches. For 2009 data, the largest count for false alarms was 36, while the largest count for false alarms for 2010 data was 51. This affects significantly the picture-in-picture (PIP) transforms. Inherently, PIP transforms show significantly fewer matches than for videos without PIP. With the false alarm threshold going up, all the transforms with PIP (transforms 2, 8 and 10) are adversely affected. Transforms 4 and 6 have lower resolution, and they are similarly adversely affected. Transform 1 is camcording, and the video frames have a lot of jitter, leading to fewer matches and therefore they are also adversely affected by the higher threshold for false alarms.

The optimal no false-alarm (FA) results shown in Table 5 use separate thresholds for each transform. In reality, it is not known a priori which transform is being used. So, it may be necessary to use only a single threshold across all transforms. Table 6 below gives results when one threshold is used across all transforms (for 2009 queries, this threshold was 36, while for 2010 queries, this threshold was 51):

TABLE 6

| | Transform | | | | | | | |
|---|---|---|---|---|---|---|---|---|
| | 1 | 2 | 3 | 4 | 5 | 6 | 8 | 10 |
| 2009 | | .022 | 0 | .052 | 0 | 0 | .037 | .12 |
| 2010 | .71 | .455 | .045 | .186 | .03 | .164 | .238 | .29 |

It will be noticed that for 2009 queries, except for transform 10, the min NDCR is the same as it was for one optimal threshold per transform. For the 2010 queries, min NDCR has gone up for all transforms except for transform 5. This increase is primarily due to the slide shows, which result in higher threshold for the false alarms.

Although various embodiments have been illustrated, this was for the purpose of describing, but not limiting, the invention. Various modifications will become apparent to those skilled in the art and are within the scope of this invention, which is defined more particularly by the attached claims.

What is claimed is:

1. A method to detect video copying, comprising:
   providing a set of reference data elements derived from a set of reference video frames in a reference video stream;
   providing a set of query data elements derived from a set of query video frames in a query video stream, each of the query data elements having a corresponding query data element identifier;
   associating with each of the reference data elements a fingerprint selected from among the query data element identifiers; and
   determining a similarity measure for the query video stream relative to the reference video stream by:
      for each snippet of the reference data elements that begins at successively shifted reference data element, identifying a segment associated with each snippet; and
      identifying one of the snippets as the best matching snippet, based on each snippet's associated segment;
      wherein the similarity measure for the query video stream relative to the reference video stream comprises at least one characteristic of the best matching snippet's associated segment.

2. The method defined in claim 1, further comprising deriving the set of reference data elements from the set of video frames in the reference video stream and deriving the set of query data elements from the set of video frames in the query video stream.

3. The method defined in claim 2, wherein each of the reference data elements is associated with a respective one of the video frames in the reference video stream, and wherein said deriving the set of reference data elements comprises, for each particular video frame in the reference video stream:
   extracting at least one feature for each of a plurality of regions of the particular video frame in the reference video stream, wherein the reference data element associated with the particular video frame in the reference video stream comprises the at least one extracted feature.

4. The method defined in claim 3, wherein each of the query data elements is associated with a respective one of the video frames in the query video stream, and wherein said deriving the set of query data elements comprises, for each particular video frame in the query video stream:
   extracting at least one feature for each of a plurality of regions of the particular video frame in the query video stream, wherein the query data element associated with the particular video frame in the query video stream comprises the at least one extracted feature.

5. The method defined in claim 4, wherein the particular video frame in the reference video stream is divided into a plurality of regions and wherein said extracting at least one feature for each of a plurality of regions of the particular video frame in the reference video stream is carried out for all of the regions of the particular video frame in the reference video stream.

6. The method defined in claim 5, wherein the particular video frame in the query video stream is divided into a plurality of regions and wherein said extracting at least one feature for each of a plurality of regions of the particular video frame in the query video stream is carried out for all of the regions of the particular video frame in the query video stream.

7. The method defined in claim 4, wherein the particular video frame in the reference video stream is divided into a plurality of regions and wherein said extracting at least one feature for each of a plurality of regions of the particular video frame in the reference video stream is carried out for less than all of the regions of the particular video frame in the reference video stream.

8. The method defined in claim 7, wherein the particular video frame in the query video stream is divided into a plurality of regions and wherein said extracting at least one feature for each of a plurality of regions of the particular video frame in the query video stream is carried out for less than all of the regions of the particular video frame in the query video stream.

9. The method defined in claim 8, wherein said extracting is carried out only for regions experiencing rapid temporal variation.

10. The method defined in claim 8, wherein said extracting is carried out for no more than half of the overall number of regions.

11. The method defined in claim 8, further comprising assigning placeholder data to those regions for which said extracting is not carried out.

12. The method defined in claim 4, wherein at least one feature for at least one region of the video frame in the reference video stream is temporally normalized and wherein at least one feature for at least one region of the video frame in the query video stream is temporally normalized.

13. The method defined in claim 4, wherein each feature includes a (value, position) pair, wherein the value is stored in a quantized format.

14. The method defined in claim 13, wherein the quantized format includes a non-floating point format.

15. The method defined in claim 4, wherein each feature includes a (value, position) pair, wherein the value is stored in an unquantized format.

16. The method defined in claim 15, wherein the unquantized format includes a floating point format.

17. The method defined in claim 1, wherein associating with each of the reference data elements a fingerprint selected from among the query data element identifiers comprises:
   selecting a reference data element;
   determining a distance between the selected reference data element and each of the query data elements;
   setting as the fingerprint associated with the selected reference data element the query data element identifier corresponding to the query data element for which the distance is minimum.

18. The method defined in claim 17, wherein said associating is performed in parallel for a plurality of the reference data elements.

19. The method defined in claim 18, wherein said determining a similarity measure is performed by a processor and wherein said associating is performed in parallel by a graphics processing unit other than the processor.

20. The method defined in claim 17, wherein each of the reference data elements includes a respective first set of (value, position) pairs each identifying a value and a position of a respective feature extracted from the reference video stream, wherein each of the query data elements includes a respective second set of (value, position) pairs each identifying a value and a position of a respective feature extracted from the query video stream, and wherein determining a distance between the selected reference data element and each of the query data elements comprises determining a total distance between the first set of (value, position) pairs corresponding to the selected reference data element and each of the second sets of (value, position) pairs, and selecting as the fingerprint associated with the selected reference.

21. The method defined in claim 20, wherein determining a total distance between the first set of (value, position) pairs corresponding to the selected reference data element and a particular one of the second sets of (value, position) pairs comprises determining a distance between the value of a first (value, position) pair in the first set of (value, position) pairs and the value of a second (value, position) pair in the particular one of the second sets of (value, position) pairs for which the position is the same, and combining the distances over all positions.

22. The method defined in claim 1, wherein identifying a segment associated with each snippet comprises:
  aligning the query data elements with the snippet;
  for each query data element and aligned reference data element, comparing the query data element identifier corresponding to the query data element and the fingerprint associated with the reference data element;
  identifying, as the segment associated with the snippet, a segment spanning those reference data elements for which the comparing yields a match.

23. The method defined in claim 1, further comprising storing the similarity measure in memory.

24. The method defined in claim 22, wherein
  identifying one of the snippets as the best matching snippet for the reference video stream comprises identifying the snippet for which the associated segment is the longest.

25. The method defined in claim 24, wherein the at least one characteristic of the best matching snippet's associated segment comprises a number of reference data elements within the segment for which the comparing yields a match.

26. The method defined in claim 24, wherein the at least one characteristic of the best matching snippet's associated segment comprises a ratio of a number of reference data elements within the segment for which the comparing yields a match and the length of the segment.

27. The method defined in claim 24, wherein the at least one characteristic of the best matching snippet's associated segment comprises the reference data element at which the best matching snippet begins.

28. The method defined in claim 24, further comprising carrying out the providing of a set of reference data elements, the associating and the determining for each of a plurality of reference video streams.

29. The method defined in claim 28, further comprising:
  identifying those of the reference video streams for which the at least one characteristic of the best matching snippet's associated segment for the respective reference video stream meets pre-determined criteria; and
  outputting an indication that the query video stream is deemed to include at least a portion of the identified reference video stream or streams.

30. The method defined in claim 29, wherein the characteristic comprises a number of matches within the segment and wherein the pre-determined criteria comprises having at least a pre-determined number of matches within the segment.

31. The method defined in claim 29, wherein the characteristic comprises a length of the segment and wherein the pre-determined criteria comprises having at least a pre-determined minimum segment length.

32. The method defined in claim 29, wherein the characteristic comprises a ratio of matches within the segment and wherein the pre-determined criteria comprises the ratio exceeding a pre-determined ratio.

33. The method defined in claim 29, further comprising storing the indication in memory in association with the query video stream.

34. The method defined in claim 29, further comprising transmitting the indication over a network.

35. A method to detect video copying, comprising:
  providing a set of query data elements derived from a set of query video frames in a query video stream, each of the query data elements having a corresponding query data element identifier;
  accessing a repository of reference sequences, each reference sequence associated with a respective reference video stream and comprising a respective set of reference data elements derived from a respective set of reference video frames in the respective reference video stream;
  for each particular reference sequence associated with a particular reference video stream:
    associating with each of its reference data elements a fingerprint selected from among the query data element identifiers;
    determining a similarity measure for the query video stream relative to the particular reference video stream by:
      for each snippet of the reference data elements that begins at successively shifted reference data element, identifying a segment associated with each snippet; and
      identifying one of the snippets as the best matching snippet, based on each snippet's associated segment;
      wherein the similarity measure for the query video stream relative to the reference video stream comprises at least one characteristic of the best matching snippet's associated segment;
  outputting an indication that a particular test video stream contains a copy of the query video stream when the similarity measure for the particular video stream relative to the query video stream meets predetermined criteria.

36. A non-transitory computer-readable storage medium storing computer-readable instructions which, when interpreted by a computing apparatus, cause the computing apparatus to implement a method to detect video copying that comprises:
  providing a set of reference data elements derived from a set of reference video frames in a reference video stream;
  providing a set of query data elements derived from a set of query video frames in a query video stream, each of the query data elements having a corresponding query data element identifier;
  associating with each of the reference data elements a fingerprint selected from among the query data element identifiers; and
  determining a similarity measure for the query video stream relative to the reference video stream by:
    for each snippet of the reference data elements that begins at successively shifted reference data element, identifying a segment associated with each snippet; and
    identifying one of the snippets as the best matching snippet, based on each snippet's associated segment;

wherein the similarity measure for the query video stream relative to the reference video stream comprises at least one characteristic of the best matching snippet's associated segment.

37. A computing system, comprising:
an input for receiving a set of query data elements derived from a set of query video frames in a query video stream, each of the query data elements having a corresponding query data element identifier;
a memory repository for storing reference sequences, each reference sequence associated with a respective reference video stream and comprising a respective set of reference data elements derived from a respective set of reference video frames in the respective reference video stream;
a processing unit for (i) associating with each of the reference data elements in each of the reference sequences a fingerprint selected from among the query data element identifiers and (ii) determining a similarity measure for the query video stream relative to at least one particular reference video stream by:
for each snippet of the reference data elements that begins at successively shifted reference data element, identifying a segment associated with each snippet; and
identifying one of the snippets as the best matching snippet, based on each snippet's associated segment;
wherein the similarity measure for the query video stream relative to the reference video stream comprises at least one characteristic of the best matching snippet's associated segment and
an output for releasing an indication of the similarity measure.

* * * * *